United States Patent [19]

Mutter et al.

[11] Patent Number: 5,560,547
[45] Date of Patent: Oct. 1, 1996

[54] HIGH ENTRAINMENT VENTURI FOR RANDOM ORBITAL SANDER DUST COLLECTION

[75] Inventors: Troy B. Mutter, Vass; Warren A. Seith, Pinehurst, both of N.C.

[73] Assignee: Ingersoll-Rand Company, Woodcliff Lake, N.J.

[21] Appl. No.: 437,257

[22] Filed: May 8, 1995

[51] Int. Cl.[6] .................................................. B24B 55/06
[52] U.S. Cl. ........................... 239/433; 239/601; 451/456
[58] Field of Search .............................. 239/428.5, 433, 239/601, 589, 590; 451/456; 144/252 R, 252 A; 409/137; 408/67; 417/198

[56] References Cited

U.S. PATENT DOCUMENTS

| | | | |
|---|---|---|---|
| 2,246,916 | 6/1941 | Fischer | 144/252 R X |
| 2,349,156 | 5/1944 | Fischer | 451/456 X |
| 2,789,404 | 4/1957 | Downing et al. | 451/456 |
| 3,625,820 | 12/1971 | Gluntz et al. | 417/198 X |
| 3,815,292 | 6/1974 | Hutchins | 451/456 X |
| 4,052,824 | 10/1977 | Hutchins | 451/456 X |

FOREIGN PATENT DOCUMENTS

| | | | |
|---|---|---|---|
| 1301137 | 7/1962 | France | 451/456 |
| 128808 | 7/1950 | Sweden | 451/456 |
| 93/14904 | 8/1993 | WIPO | 451/456 |

*Primary Examiner*—Lesley D. Morris
*Attorney, Agent, or Firm*—Walter C. Vliet

[57] ABSTRACT

A venturi nozzle for high entrainment vacuum use for random orbital sander dust collection having a nozzle design which improves the nozzle jet to promote a uniform velocity profile across the diameter of the jet nozzle as well as a thin shear layer by providing a shallow angle nozzle approach, a smooth transition flow into the nozzle throat and an accurate nozzle departure radius.

7 Claims, 2 Drawing Sheets

HIGH ENTRAINMENT VENTURI FOR RANDOM ORBITAL SANDER DUST COLLECTION

BACKGROUND OF THE INVENTION

Venturi type vacuum sources commonly used with pneumatic random orbital sanders for dust collection purposes typically provide poor performance. Typically current competitive sanders entrain less than 12 standard cubic feet per minute (SCFM) of air using the exhaust air of the tool which is typically more than 12 SCFM. The entrainment ratio is defined as the entrained air flow divided by the supply air flow and is a measure of the efficiency of venturi device. Using this definition, the entrainment ratio of current competitive product is less than 1.

The required flowrate for full dust evacuation with the random orbital sanders has been determined to be 20 to 25 SCFM of vacuum flow.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a high entrainment venturi for dust collection comprising a nozzle for discharging a flow of air; an entrainment area adjacent the nozzle; a diffuser having a throat area for receiving the discharge of air and entrainment air; the nozzle characterized by a means for reducing the viscous shear layer comprising a shallow convergence inlet followed by a short straight section.

The foregoing and other aspects of the invention will become apparent from the following detailed description of the invention when considered in conjunction with the accompanying drawing figures.

BRIEF DESCRIPTION OF THE DRAWING FIGURES

DETAILED DESCRIPTION

Figure 1:
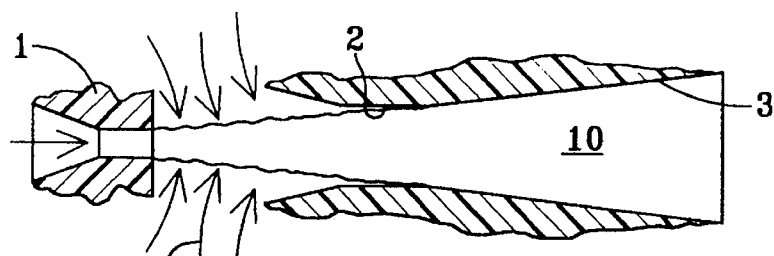
FIG. 1 is a schematic drawing of a vacuum eductor showing its essential components according to the present invention.

A typical venturi consists of three parts; a nozzle 1, a throat area 2, and a diffuser area 3, as shown in FIG. 1. The nozzle serves to accelerate the exhaust air of the tool into a high velocity stream of air or a jet. The jet then entrains air from the surroundings 4 by means of the "venturi" effect. The combined air streams are contained by the throat and are decelerated efficiently by the diffuser 3 to reduce head losses. To maximize the entrainment of the venturi the so called "venturi effect" must be maximized.

Figure 2:
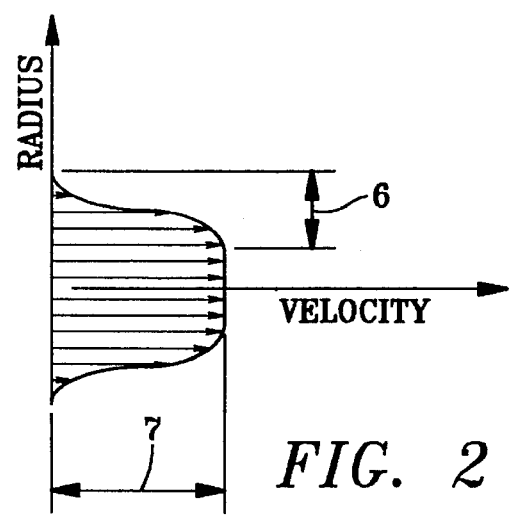
FIG. 2 is a velocity profile for a venturi nozzle according to the present invention.

The venturi effect results from forces applied on the surrounding fluid by the jet 10. These forces consist primarily of two types; viscous shear forces and pressure gradients. The viscous shear force is transferred from the jet 10 to the surrounding fluid through the shear layer 6 of the jet as shown in FIG. 2. This shear force is proportional to the gradient of the velocity profile 7 and can thus be increased by thinning the shear layer which increases the velocity gradient.

Figure 3:
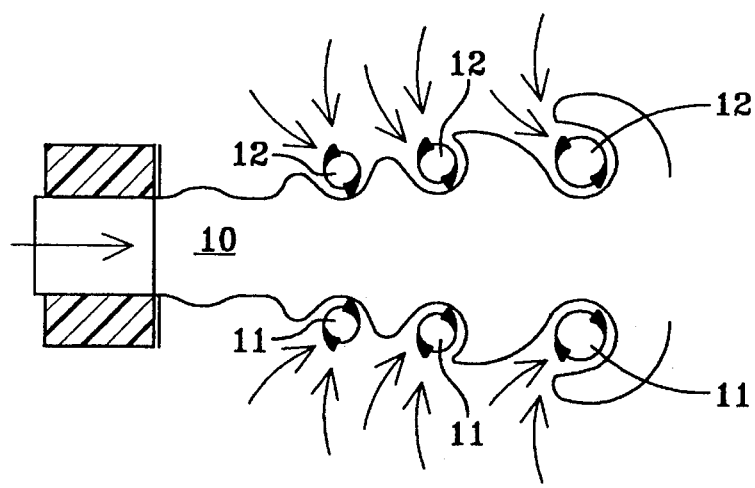
FIG. 3 is a schematic detail of the vortical structures existing in the low pressure regions surrounding the venturi jet.

The second mechanism driving entrainment or the venturi effect is pressure gradients which drive the surrounding air into the jet 10. These pressure gradients arise through the hydrodynamic instability of the jet. As the jet leaves the nozzle 1, it begins to develop vortical structures 11, primarily azimuthal vorticity, that grow in size and strength in the axial direction and eventually collapse. At the center of the vortical structures exists a low pressure region 12 due to the swirling flow and it is this low pressure region which presents the pressure gradient in relation to the surrounding ambient conditions. This phenomena is shown in FIG. 3 and is the topic of much research today by those investigating the nature of turbulence. A common finding resulting from these investigations is that the instability and hence the initial strength of the vortical structures can be increased by thinning the shear layer.

Figure 4:
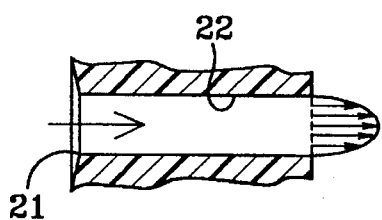
FIG. 4 is a schematic of a venturi nozzle according to the prior art showing a typical fully developed velocity profile.
Figure 5:
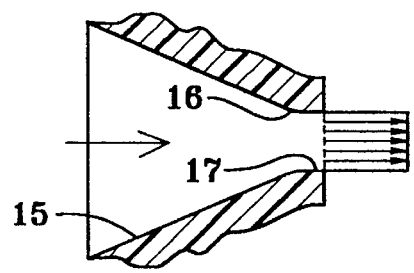
FIG. 5 is a schematic of a venturi showing an idealized profile for maximum efficiency.

Since thinning the shear layer increases both mechanisms that contribute to the venturi effect, the venturi nozzle 1 must be designed to thin the shear layer 6 at the exit in order to maximize entrainment. As shown in FIG. 4, a typical venturi nozzle contains sharp edges at the entrance 21 and long straight sections 22 which increase the thickness of the shear layer at the exit of the nozzle. The nozzle design according to the present invention is shown in FIG. 5 and detailed in FIG. 7. Since the velocities upstream of the nozzle are subsonic, the nozzle was shaped with continually decreasing cross sectional area 15 in order to accelerate the fluid and produce the thinnest shear layer possible with minimum back pressure. This is achieved with a conical section 15 followed by a radius 16 and a short section 17 for manufacturing ease.

Figure 6:
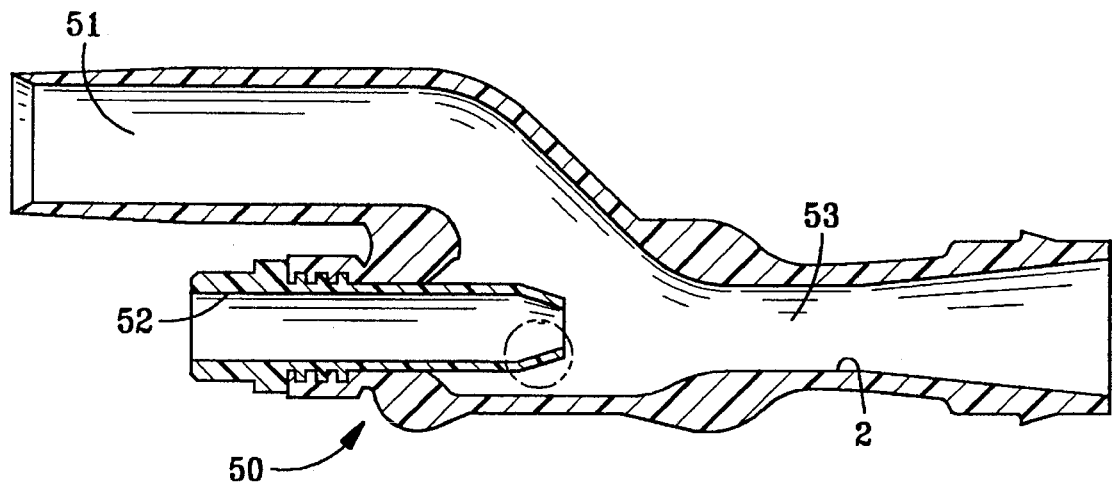
FIG. 6 is a cross section of a venturi vacuum entrainment nozzle designed according to the present invention.

FIG. 6 shows a high entrainment venturi nozzle assembly for random orbital sanders designed according to the present invention.

The nozzle assembly generally designated by the reference numeral 50 comprises a generally offset Y housing constructed of a thermal plastic material or the like. The housing is provided with generally circular internal passageways as follows: a vacuum flow passage 51, a venturi nozzle 52, and an exit throat passage 53.

The vacuum flow passage 51 receives air and entrained particles from the work surface and transports the vacuum flow as smoothly as possible into the venturi nozzle area. Exhaust air from the air motor of the sander is exhausted through the venturi nozzle 1 in passage 52. The exhaust air passing through the nozzle forms the venturi jet required to form the vacuum and hence the vacuum flow.

The air exiting the nozzle forms the required venturi effect in cooperation with the throat area 2 which is formed in the base of the Y. The exhaust air and entrained vacuum flow exit the venturi assembly through passageway 53 into a dust collector typically in the form of a porous bag or the like which permits separation of the exhaust air from the entrained particles collected by the vacuum.

Figure 7:
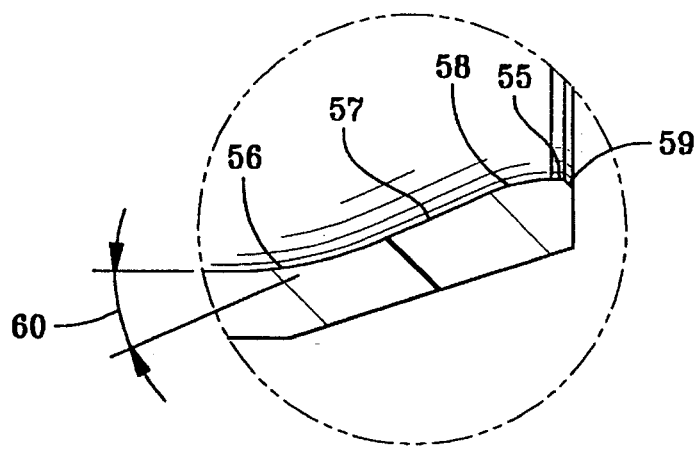
FIG. 7 is a detail of the venturi nozzle tip producing the improved velocity gradient according to the present invention.
Figure 8:
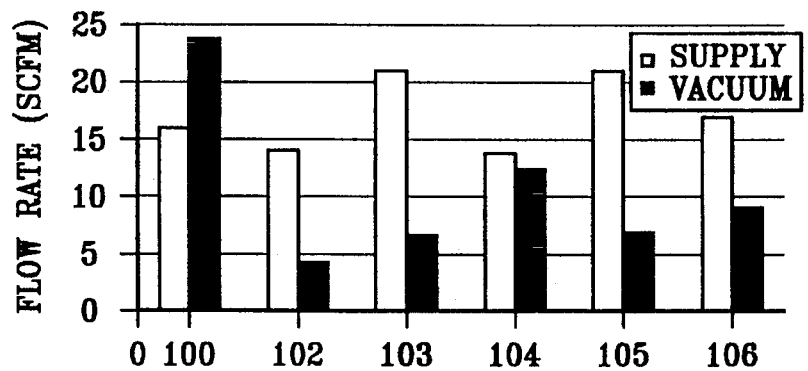
FIG. 8 is a graph showing the improved vacuum flow rate obtained with the present invention compared to known samples of the prior art.

Specific details of the venturi nozzle that obtains the unexpected improved results according to the present invention are detailed in FIG. 7. In particular, it has been found that a nozzle according to the present invention having a nozzle throat 55 diameter of approximately 0.186 inches is effectively formed in a venturi nozzle by forming the nozzle restriction using a one-half inch diameter radius entry 56 into a shallow convergent inlet or conical section 57 (typically formed utilizing a convergence angle 60 approximately 20 degree from the axis although a useful range is thought to be between 10 and 30 degrees from the axis) followed by a second 0.25 inch radius section 58 terminating in a 0.020 inch straight section forming the nozzle throat of approximately 0.186 inch diameter and finally terminating in a 0.010 inch 45 degree exit chamfer 59, as detailed in FIG. 7.

The diffuser 53 is formed with a diffuser throat diameter of approximately 0.520 inches and is spaced apart from the nozzle exit so that the natural expansion of the venturi jet tangentially intersects the diffuser throat as shown in FIG. 1.

The entrainment or vacuum flow provided by utilization of these techniques in the sander according to the present invention 100 is shown in FIG. 7 along with several competitive products 101 to 106. With this technology, a vacuum flow of 24 SCFM was obtained using an exhaust air flow rate for the sander motor of approximately 16 SCFM at an effective average pressure of approximately 5 PSIG (approximately twice the nearest competitive product) yielding an entrainment ratio of 1.5.

Having described our invention in terms of a preferred embodiment, what is claimed is:

1. A high entrainment venturi for dust collection comprising:

a nozzle for discharging a flow of air; an entrainment area adjacent said nozzle; a diffuser having a throat area for receiving said discharged flow of air and air from said entrainment area;

said nozzle characterized by a means for reducing the viscous shear layer comprising a shallow convergence inlet followed by a short straight section;

said shallow convergence inlet is further defined by a radius transition from an air supply to a convergence cone formed about a flow axis having a convergence angle in range of 10 to 30 degrees from said flow axis; and said short straight section is further defined by a second radius transition from said convergence cone to a constant diameter section of short length.

2. A high entrainment venturi according to claim 1, wherein said convergence angle is approximately 20 degrees.

3. A high entrainment venturi according to claim 1, wherein said constant diameter section is followed by a formed exit chamfer.

4. A high entrainment venturi according to claim 1, wherein said nozzle discharges a defined air flow having a natural expansion which tangentially intersects said throat area of said diffuser.

5. A high entrainment venturi for dust collection in a random orbital sander comprising:

a nozzle for discharging a flow of exhaust air from a sander motor;

an entrainment area adjacent said nozzle receiving a vacuum induced flow;

a diffuser having a throat area for tangentially receiving discharge of air from said nozzle and said entrainment area;

said nozzle characterized by a means for reducing the viscous shear layer comprising a shallow convergence inlet followed by a short straight section; and said short straight section is further defined by a second radius transition from said convergence cone to a constant diameter section of short length.

6. A high entrainment venturi according to claim 5, wherein said convergence angle is approximately 20 degrees.

7. A high entrainment venturi according to claim 5, wherein: said nozzle has a throat diameter of approximately 0.186 inches, a convergence angle of approximately 20 degrees; a radiused transition having a radius of 0.5 inches; a second radiused transition of 0.25 inches; and said diffuser having a throat diameter of 0.520 inches; said nozzle receiving a flow of exhaust air from a sander motor around 16 SCFM and inducing an entrainment flow vacuum around 25 SCFM for an entrainment ratio of 1.5.

* * * * *